United States Patent
Porter

(10) Patent No.: US 10,824,741 B1
(45) Date of Patent: Nov. 3, 2020

(54) DEVICE LOCKDOWN

(71) Applicant: Alarm.com Incorporated, Tysons, VA (US)

(72) Inventor: Travis Brandon Porter, Aurora, CO (US)

(73) Assignee: Alarm.com Incorporated, Tysons, VA (US)

( * ) Notice: Subject to any disclaimer, the term of this patent is extended or adjusted under 35 U.S.C. 154(b) by 321 days.

(21) Appl. No.: 15/922,835

(22) Filed: Mar. 15, 2018

Related U.S. Application Data

(60) Provisional application No. 62/471,897, filed on Mar. 15, 2017.

(51) Int. Cl.
| | |
|---|---|
| G06F 21/60 | (2013.01) |
| G06F 21/62 | (2013.01) |
| G08B 13/00 | (2006.01) |
| G06F 21/31 | (2013.01) |
| G06F 21/35 | (2013.01) |
| H04W 4/029 | (2018.01) |

(52) U.S. Cl.
CPC .......... G06F 21/604 (2013.01); G06F 21/313 (2013.01); G06F 21/6218 (2013.01); G08B 13/00 (2013.01); *G06F 21/35* (2013.01); *H04W 4/029* (2018.02)

(58) Field of Classification Search
CPC .. G06F 21/604; G06F 21/6218; G06F 21/313; G06F 21/35; G06F 2221/2143; G08B 13/00; H04W 4/029
USPC .......................................................... 707/783
See application file for complete search history.

(56) References Cited

U.S. PATENT DOCUMENTS

| | | | | |
|---|---|---|---|---|
| 5,748,084 | A * | 5/1998 | Isikoff | G01S 5/04 340/5.74 |
| 7,159,120 | B2 * | 1/2007 | Muratov | G06F 21/31 380/277 |
| 7,543,144 | B2 * | 6/2009 | Rensin | G06F 21/313 713/164 |

(Continued)

OTHER PUBLICATIONS

Caldwell, Tracey, et al., "The mobile 'kill pill'—poison or panacea?", Computer Fraud & Security, vol. 2011, Issue 10, Oct. 2011, pp. 8-12.*

(Continued)

*Primary Examiner* — Robert Stevens
(74) *Attorney, Agent, or Firm* — Fish & Richardson P.C.

(57) ABSTRACT

Methods, systems, and apparatus, including computer programs encoded on a storage device, for securing device data in response to an event. A method includes receiving an instruction to initiate execution of a user device data protection protocol after a determination by a monitoring unit that an event has occurred at a property, determining whether the user device is located at the property, and in response to a determination that the user device is located at the first location, displaying a prompt that asks if the user device data protection protocol should be canceled. The method also include actions of determining whether user feedback responsive to the prompt has been received by the user device within a predetermined amount of time, and in response to a determination that the predetermined amount of has expired without receiving user feedback, performing one or more data protection operations to protect user device data.

20 Claims, 7 Drawing Sheets

(56) References Cited

U.S. PATENT DOCUMENTS

| | | | | |
|---|---|---|---|---|
| 7,546,639 | B2* | 6/2009 | Bantz | G06F 21/88 726/2 |
| 7,603,435 | B2* | 10/2009 | Welingkar | H04W 4/00 709/217 |
| 7,607,027 | B2* | 10/2009 | Williams | G06F 21/88 713/193 |
| 8,419,806 | B2* | 4/2013 | Chase | G06F 21/88 726/35 |
| 8,467,770 | B1* | 6/2013 | Ben Ayed | H04L 63/107 455/411 |
| 8,635,661 | B2* | 1/2014 | Shahbazi | H04L 63/083 380/270 |
| 8,875,304 | B2* | 10/2014 | Celi, Jr. | G06F 21/60 726/26 |
| 9,111,109 | B2* | 8/2015 | Islam | G06F 21/6218 |
| 9,154,499 | B2* | 10/2015 | Stevens | H04L 63/0846 |
| 2009/0151005 | A1* | 6/2009 | Bell | H04L 63/1416 726/28 |
| 2009/0298468 | A1* | 12/2009 | Hsu | H04W 12/0802 455/411 |
| 2011/0218965 | A1* | 9/2011 | Lee | G06F 21/305 707/640 |
| 2014/0338006 | A1* | 11/2014 | Grkov | H04L 63/14 726/35 |
| 2015/0347205 | A1* | 12/2015 | Stanley-Marbell | G06F 9/4843 719/318 |
| 2016/0105644 | A1* | 4/2016 | Smith | H04N 5/23206 348/159 |
| 2017/0070563 | A1* | 3/2017 | Sundermeyer | H04L 67/025 |

OTHER PUBLICATIONS

Zhang, Nan, et al., "Cloud Shredder: Removing the Laptop On-Road Data Disclosure Threat in the Cloud Computing Era", TrustCom 2011, Changsha, China, Nov. 16-18, 2011, pp. 1592-1599.*

* cited by examiner

DEVICE LOCKDOWN

CROSS-REFERENCE TO RELATED APPLICATIONS

This application claims the benefit of the U.S. Provisional Patent Application No. 62/471,897 filed Mar. 15, 2017 and entitled "Device Lockdown," which is incorporated herein by reference in its entirety.

BACKGROUND

Events can occur that result in theft of, or damage to, personal property and real property. Such events may include a fire, a flood, a home invasion, or the like. A theft of, or damage to, a user device may cause loss of not only the user device—but also the data that is stored on the user device.

SUMMARY

The subject matter of the present disclosure is related to a cross-platform application that secures devices during a home intrusion event to limit the theft of private data. The application will run locally on the device and either poll the status of the home or receive a push message in the event of an intrusion. Upon detecting the intrusion, the application will attempt to lock down the device by locking, shutting down, or deleting private data. If the intruder is successful in stealing the devices, the systems and methods of the present disclosure ensure that the device will be in a more secure state. This will help prevent the theft of valuable private data.

According to one innovative aspect of the present disclosure, a method for securing device data in response to an event detected at a property may include receiving, by a user device and from a monitoring unit, an instruction to initiate execution of a user device data protection protocol after a determination by the monitoring unit, based on (i) sensor data from one or more sensors installed at a property or (ii) image data or video data from one or more cameras installed at the property, that an event has occurred at the property, determining whether the user device is located at the property, in response to a determination that the user device is located at the first location, displaying, by the user device, a prompt that asks if execution of the user device data protection protocol should be canceled, determining whether user feedback responsive to the prompt has been received from a user of the user device within a predetermined amount of time; and in response to a determination that the predetermined amount of has expired without receiving user feedback responsive to the prompt, performing one or more data protection operations initiated by the device data protection protocols to protect user device data.

Other aspects includes corresponding methods, apparatus, and computer programs to perform actions of methods defined by instructions encoded on computer storage devices.

These and other versions may optionally include one or more of the following features. For instance, in some implementations, the method may further include in response to a determination that the user device is not located at the first location, cancelling execution of the user device data protection protocol without displaying a prompt that asks if execution of the device data protection protocol should be canceled.

In some implementations, the method may further include in response to a determination that user feedback responsive to the prompt (i) has been received from a user of the user device within the predetermined amount of time and (ii) indicates that execution of the device data protection protocol should be canceled, canceling execution of user device data protection protocol without performing additional data protection operations to protect device data.

In some implementations, the one or more data protection operations may include locking the user device until a user of the user device inputs predetermined authentication information that can be processed, by the user device, to unlock the user device.

In some implementations, the one or more data protection operations may include shutting down the user device.

In some implementations, \the one or more data protection operations may include initiating upload of at least a portion of the device data stored on the user device to a cloud storage device.

In some implementations, the one or more data protection operations may include initiating deletion of at least a portion of the device data stored on the device.

In some implementations, the one or more data protection operations may include initiating encryption of at least a portion of the device data stored on the device.

In some implementations, the one or more data protection operations may include (i) locking the user device until a user of the user device inputs predetermined authentication information that can be processed, by the user device, to unlock the user device, (ii) shutting down the user device, (iii) initiating upload of at least a portion of the device data stored on the user device to a cloud storage device, (iv) initiating deletion of at least a portion of the device data stored on the device, or (v) initiating encryption of at least a portion of the device data stored on the device.

In some implementations, the method include selecting a data protection operation of the one or more data protection operations to perform, wherein the selecting includes selecting a particular data protection operation of the one or more data protection operations based on user preferences specified in a device data protection profile.

In some implementations, the one or more data protection operations comprises one of (i) initiating upload of at least a portion of the device data stored on the user device to a cloud storage device, (ii) initiating deletion of at least a portion of the device data stored on the device; or (iii) initiating encryption of at least a portion of the device data stored on the device, and the method may further include identifying, based on user preferences specified in a device data protection profile, a particular portion of the device data as the first portion of the device data to be uploaded, deleted, or encrypted during performance of the one or more data protection operations.

In some implementations, the one or more or data protection operations comprises one of (i) initiating upload of at least a portion of the device data stored on the user device to a cloud storage device, (ii) initiating deletion of at least a portion of the device data stored on the device, or (iii) initiating encryption of at least a portion of the device data stored on the device, and the method may further include identifying, based on a determination that a particular file is open on the user device, the particular file as the first portion of the device data to be uploaded, deleted, or encrypted during performance of the one or more data protection operations.

In some implementations, the monitoring unit is positioned at a location that is remote from the property.

These and other implementations are described in more detail in the detailed description and accompanying drawings.

DETAILED DESCRIPTION

The present disclosure is generally directed towards a system that protects data stored on a device, data that is accessible using the device, or both. The present disclosure helps to secure data stored on a device by triggering execution of a device data protection protocol in response to a detected event. The device data protection protocol may include instructions for performing a series of operations that includes, for example, first triggering a user device to determine if the user device is at the same location as the detected event, and if the device is at the same location as the detected event, trigger the user device to prompt for user feedback that requests whether additional device data protection operations should be performed. Then, in some implementations, based on the type of user feedback received, if any, responsive to the prompt, the user device may continue to perform the device data protection protocol via the performance of one or more additional device data protection operations including, for example, (i) backing up device data to a cloud server, (ii) deleting device data, (iii) locking down the device, (iv) shutting down the device, or (v) one or more operations leading to the execution of (i), (ii), (iii), or (iv). In some implementations, user feedback can be received responsive to the prompt that cancels the device data protection protocol without performing any additional operations.

Alternatively, in some implementations, performance of the one or more additional device data protection operations may begin simultaneously, or near simultaneously, with the display of the prompt. In such instances, if user feedback is received that requests cancellation of the additional user device data protection operations, then the additional user device data protection operation may be cancelled without being further performed. For example, in such implementations, backing-up device data to the cloud server can be stopped, after initially being started, responsive to the user feedback. Simultaneous, or near simultaneous, initiation of both the prompt and one or more other additional device data protection operations may provide the advantage of taking steps to secure device data while waiting for user feedback. In some implementations, this may ensure that the most important data such as currently open files are secured to a back-up cloud server.

Figure 1:
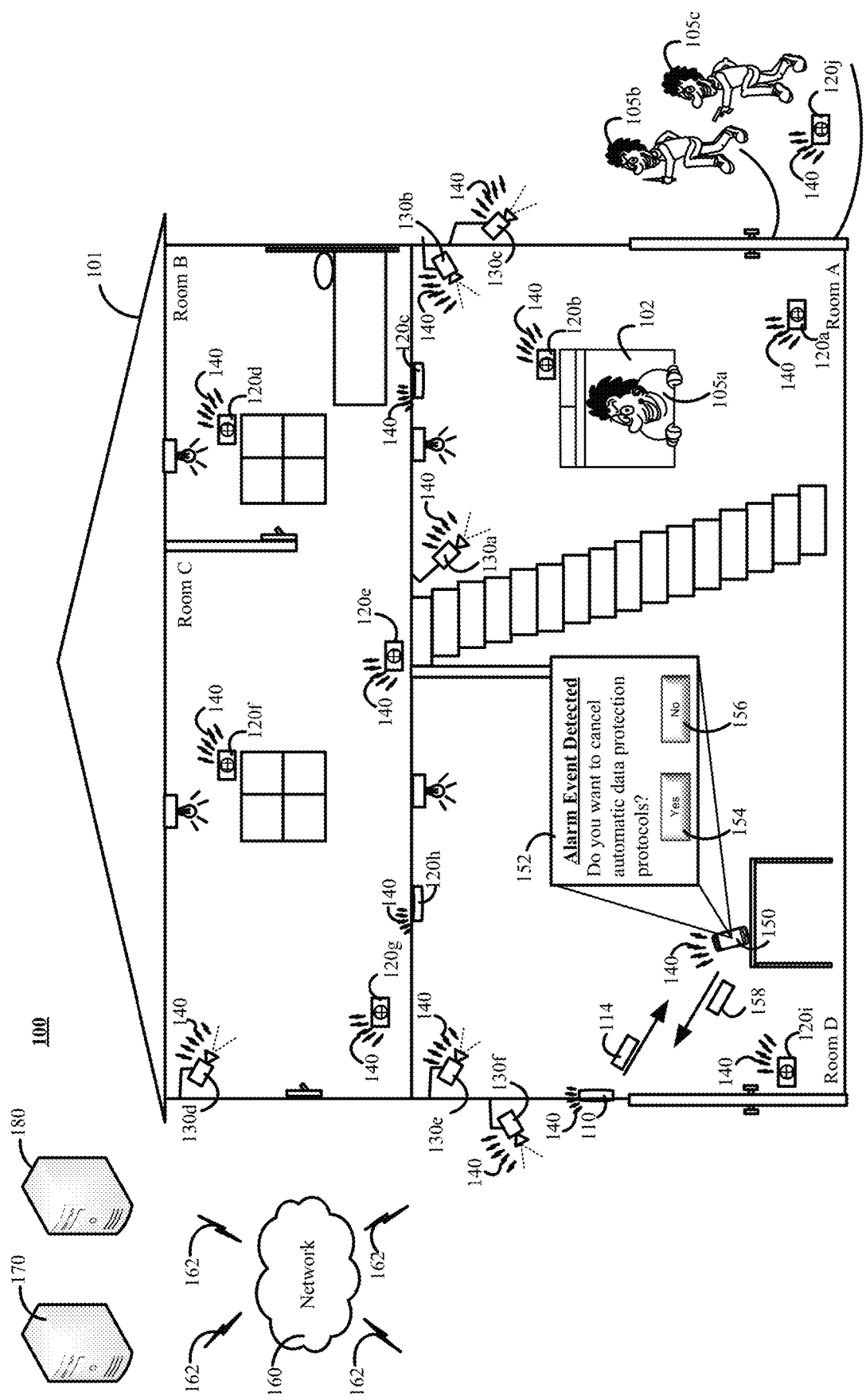
FIG. 1 is a contextual diagram of an example property monitoring system that protects data on a device in response to the detection of a home invasion.

FIG. 1 is a contextual diagram of an example property monitoring system 100 that protects data on a device in response to the detection of a home invasion. The system 100 includes at least a monitoring system control unit 110, one or more sensors 120a, 120b, 120c, 120d, 120e, 120f, 120g, 120h, 120i, 120j, network 140, and a user device 150. The network 140 may include a LAN, a WAN, a cellular network, the Internet, or a combination thereof. The user device 150 may include a smartphone, a smartwatch, a tablet, a laptop computer, a desktop computer, or the like. Other optional components of a system 100 are also depicted in FIG. 1 such as one or more cameras 130a, 130b, 130c, 130d, 130e, 130f, a network 160, a monitoring application server 170, and a cloud storage server 180.

The monitoring system control unit 110 obtains sensor data that is generated by one or more sensors 120a, 120b, 120c, 120d, 120e, 120f, 120g, 120h, 120i, 120j. The monitoring system control unit 110 may analyze the obtained sensor data in order to infer whether one or more potential events are occurring in the property 101, within a predetermined proximity of the property 101, or both. Alternatively, in other implementations, the monitoring system control unit 110 may relay the obtained sensor data to the monitoring application server 170 using the networks 140, 160 and one or more communication links 162. In such implementations, the monitoring application server 170 may analyze the obtained sensor data in order to infer whether one or more potential events are occurring in the property 101. The monitoring application server 170 may then transmit a communication to the monitoring system control unit 110 indicating whether an event is detected in the property 101.

Events may include, for example, alarm events, emergency events, or the like. Alarm events may be inferred based on one or more sensors such as sensors 120a, 120b, 120c, 120d, 120e, 120f, 120g, 120h, 120i, 120j generating data that is indicative of a potential intruder 105a, 105b, 105c breaking-and-entering into property 101, a trespasser trespassing within a predetermined proximity of property 101, or the like. Emergency events may be inferred based on one or more sensors such as sensors 120a, 120b, 120c, 120d, 120e, 120f, 120g, 120h, 120i, 120j generating data that is indicative of a potentially hazardous event such as the presence of smoke, fire, carbon monoxide (or other gas), or the like. The detection of yet other types of events may also fall within the scope of the present disclosure.

Though events may be detected based data output by one or more sensors 120a, 120b, 120c, 120d, 120e, 120f, 120g, 120h, 120i, 120j, the present disclosure need not be so limited. For example, an event may also be detected based on data that is captured by one or more cameras 130a, 130b, 130c, 130d, 130e, 130f. For example, images, video, or both may be captured by one or more cameras 130a, 130b, 130c, 130d, 130e, 130f and streamed to the monitoring system control unit 110, the monitoring application server 170, or both. The images, video, or both may be analyzed to determine whether the images, video, or both include data that is indicative of an alarm event such as, for example, a picture of an intruder on the property. In some implementations, a camera may be mounted to a robotic drone that can navigate the property and collect images, videos, or the like of objects on the property 101 grounds. Such images, video, or both can be analyzed in an effort to detect potential events.

Thus, either the monitoring system control unit 110 or monitoring application server 170 can detect the occurrence of an event based on sensor data generated by one or more sensors 120*a*, 120*b*, 120*c*, 120*d*, 120*e*, 120*f*, 120*g*, 120*h*, 120*i*, 120*j* or images, video, or both, from one or more of cameras 130*a*, 130*b*, 130*c*, 130*d*, 130*e*, 130*f*. In general, any of the operations described in this specification as being performed by the monitoring system control unit 110 can also be performed by the monitoring application server 170. Accordingly, the monitoring application server 170 can be utilized as a cloud-based monitoring system control unit that is located remote from the property 101.

With reference to FIG. 1, a sensor 120*b* has detected that an intruder 105*a* has broken window 102 in an attempt to gain entry to the property 101. In addition, the sensor 120*j* has detected movement of multiple intruders trying to gain access to the property 101 via the front door. The sensors 120*b* and 120*j* generate sensor data that is transmitted, for example, to the monitoring system control unit 110. The monitoring system control unit 110 may analyze the received sensor data and determine that an alarm event (e.g., a home invasion) is in progress. Alternatively, or in addition, the monitoring system control unit 110 can relay the received sensor data to the monitoring application server 170 via the networks 140 and 160. The network 160 may include a LAN, WAN, a cellular network, the Internet, or a combination thereof. In such instances, the monitoring application server 170 can analyze the received sensor data and determine that an alarm event (e.g., a home invasion) is in progress. The monitoring application server 170 can transmit data to the monitoring system control unit 110 indicating the existence of the alarm event. The monitoring system control unit 110, monitoring application server 170, or both may store data describing the current status of monitoring system 100 (e.g., active alarm event, active emergency event, no event detected, or the like).

The monitoring system control unit 110 (or monitoring application server 170) can use a message 114 to initiate a device data protection protocol on the user device 150. The monitoring system control unit 110 (or monitoring application server 170) can generate the message 114 that includes instructions that can trigger a device such as device 150 to initiate the device data protection protocol. In some implementations, the monitoring system control unit 110 (or monitoring application server 170) can generate the message 114 based on (i) the detection of an alarm event, (ii) stored data indicating that the monitoring system 100 is currently undergoing an active alarm event, or (iii) both. The monitoring system control unit 110 (or monitoring application server 170) can transmit the message 114 to the device 150 via the network 140. The message 114 may be transmitted to the device 150 independent of any requests from the device 150. Alternatively, or in addition, the message 114 may be transmitted to the device 150 via the network 140 in response to a polling request received by the monitoring system control unit 110 (or monitoring application server 170) from the device 150 via the network 140.

The device data protection protocol may include instructions that initiate performance of a series of operations that include initiating the device 150 to check its location to determine whether the device 150 is located at the same location as the detected event (or within a predetermined distance of the detected event) and triggering of a prompt for user feedback as to whether one or more additional device data protection operations should be performed (or continue to be performed). Additional device data protection operations may be performed, or continue to be performed, such as (i) backing up device data to a cloud server, (ii) deleting device data, (iii) locking down the device, (iv) shutting down the device, or (v) one or more operations leading to the execution of (i), (ii), (iii), or (iv), based on the user feedback received.

With reference to the example of FIG. 1, the device 150 receives the message 114 that includes an instruction to initiate a device data protection protocol. Responsive to the instructions provided with message 114, the device 150 determines whether the device 150 is located at the property 101 where the alarm event was detected. The device 150 can use one or more parameters to determine its location such as GPS coordinates, a WiFi SSID, a WAN/LAN IPS, or a statically defined location. If the device 150 determines that the device 150 is located at the property 101 where the alarm event was detected, then the device 150 can continue to the perform device data protection protocol by displaying a prompt for user feedback, and in some implementations, performing one or more additional device data protection operations. If, however, the device 150 determines that the device 150 is not located at the property 101 where the alarm event was detected, then the device 150 cancels the execution of the device data protection protocol. In the example of FIG. 1, the device 150 determines that it is located at the same property 101 where the alarm event was detected. Accordingly, the device 150 decides to continue to execute device data protection protocol.

The device 150 can continue execution of the device data protection protocol by displaying a prompt 152 asking the user of the device 150 if the user wants to cancel execution of the device data protection protocol. The prompt 152 may be configured so that it is does not interrupt any emergency calls being made by the device. In one implementation, the prompt may include an option to cancel execution of the device data protection protocol 154 or continue with the device data protection protocol 156 by performing one or more additional device data protection operations. In some implementations, the prompt 152 may ask the user of the user device 150 to input a password, pin number, biometric identifier (e.g., fingerprint, voiceprint, facial recognition scan, DNA sample, or the like), or the like in order to cancel execution of the device data protection protocol. In some implementations, cancelling execution of the device data protection protocol may also unlock the device 150. The device 150 is programmed to wait a predetermined amount of time for a response from the user. In some implementations, during this wait time, the device 150 will not begin performing the device data protection operations such as backing-up data to a cloud server 180, erasing device data from the device 150, locking down the device 150, shutting down the device 150, encrypting data on the device 150, or the like. Once the predetermined amount of time expires, the device 150 is configured to execute device data protection operations. In other implementations, performance of the one or more additional device data protection operations may begin simultaneously, or near simultaneously, with the display of the prompt in order to expedite protection of the device data.

Performance of additional data protection operations may include locking down the device so that no user without a necessary password, personal identification number (PIN), facial recognition identifier, or the like can access the device. Alternatively, executing device data protection operations by the device 150 may include shutting down the device 150. A device lock down may be achieved using the login or lock screen provided by the device's 150 manufacturer. After device 150 is locked down (or simultaneously, or near simultaneously, therewith), the device 150 is instructed to begin device data backup operations, device data deletion operations, data encryption operations, or the like. Device data backup operations, device data deletion operations, data encryption operations, or the like may be performed based on the instructions provided in a device profile.

The device profile may include user preferences for device data protection. For example, the user can modify one or more settings in the device profile that indicate to the device 150 the user's preference regarding backup of data, deletion of data, encryption of data, or the like. In some implementations, the user can identify one or more files, file types, or the like that are most important for backup in response to the execution of the device data protection protocol responsive to an alarm event. For example, the user can specify that all image files stored on the device 110 should be backed-up to the cloud server 180 first in response to the execution of the device data protection protocol responsive to an alarm event. Alternatively, a user can tag a particular document for upload to the cloud server 180 in response to the execution of the device data protection protocol responsive to an alarm event. In some implementations, a device profile may have a setting that can be toggled which, when activated, instructs the device to backup all active documents (or other file types, e.g., spreadsheets, power point slides, pdfs, image files, video files, or the like), all unsaved documents (or other file types, e.g., spreadsheets, power point slides, pdfs, image files, video files, or the like), or the like. Alternatively, a user may toggle settings in the device profile to perform an incremental backup that begins backing up data from the device 150 that is new since the last backup of device 150. Each of the aforementioned backups may be performed by the device uploading 150 the device data using one or more networks such as network 140 and 160.

In a similar manner, the user of the device 150 can modify one or more settings related to the deletion of data. For example, the user can specify that all (or a portion of) stored logins (e.g., user name and password combinations) should be deleted, that all (or a portion of) a user's browsing history should be deleted, or the like. Alternatively, the user can toggle settings in the device profile that instruct the device 150 to wipe all device data in response to the execution of the device data protection protocol responsive to an alarm event. Alternatively, the user may toggle settings in the device profile that instruct the device 150 to begin deleting data, records, files, or the like in a predetermined order (e.g., deleting active documents, deleting recently accessed documents, deleting documents tagged for deletion in response to a detected event, deleting files of a particular type, or the like). In some implementations, the device profile may include settings that can be toggled to kill any active processes, kill any active processes process using user data, or the like in response to the execution of the device data protection protocol responsive to an alarm event.

In a similar manner, the user of the device 150 can modify one or more settings related to the encryption of data. For example, the user can specify that all (or a portion) of the data stored on a device can be encrypted in response to the detection of an event such as an alarm event. In some implementations, the user may toggle settings in the device profile that instructs the device 150 to begin encrypting data records, files, or the like in a predetermined order (e.g., encrypting active documents, encrypting recently accessed documents, encrypting documents tagged for encryption in response to a detected event, encrypting documents tagged for deletion in response to a detected event, encrypting files of a particular type, or the like). In some implementations, the user of the device 150 may have one or more decryption keys stored in a predetermined location such as another device, a notepad, locked up in a safe, or the like. Alternatively, the one or more decryption keys may be stored on a server such as the monitoring application server 170, the cloud storage server 180, or the like. In such instances, the user of device 150 may download (or otherwise access) the one or more decryption keys from the monitoring application server 170, the cloud storage server 180, or the like and use the one or more description keys to decrypt the encrypted data on the device 150 as some point in the future after data on the device 150 has been encrypted.

In some implementations, a user may personally customize the settings of the device profile so that the device data protection protocol performed by the device is tailored to the user's preferences. In other implementations, another entity may configure settings of the device profile such as, for example, the user's employer. In yet other implementations, a default device profile may be used that includes a set of one or more default settings.

In some implementations, the device profile may facilitate customizing the device profile settings based on event type. For example, a user of the device 150 may configure the device profile so that the device 150 performs a first set of operations in response to execution of a device data protection protocol, based on the device profile, responsive to an alarm event. Separately, a user of the device 150 may configure the device profile so that the device 150 performs a second set of operations in response to execution of device data protection protocols, based on the device profile, in response to the execution of device profile. In some implementations, the second set of operations may include at least one operation that is not part of the first set of operations, the first set of operations may include at least one operation that is not part of the second set of operations, or the first set of operations and the second set of operations may be the same.

During the backup processes, deletion processes, or both, the device 150 may continue to execute GPS tracking features. The GPS tracking features executing on the device 150 may be used to track and locate one or more intruders 105a, 105b, 105c that may have removed the device 150 from the property 101.

In the example described above, the initiation a device data protection protocol was triggered in response to the detection of an event by a monitoring system control unit 110 (or monitoring application server 170) based on an analysis of sensor data, image data, or video data. However, the present disclosure need not be so limited. For example, in some implementations, the monitoring system control unit 110 or monitoring application server 170 may determine that an event is occurring at a property based on a determination a resident at the property 101 has pressed a "panic button" at the property 101. The "panic button" may include a button, whose selection, triggers the occurrence of alarm event, an emergency event, or the like. The "panic button" may include a physical button that is connected to the monitoring system control unit 110 (or monitoring application server 170) either using one or more wired network connections or one or more wireless network connections. Alternatively, or in addition, the "panic button" 110 may include a virtual button that is displayed in the user interface of a user device 150. The virtual "panic button" may be provided via a mobile application of a monitoring system 100 provider. The triggering of the event based on the pressing of the "panic button" can trigger the broadcasting of one or more messages that can be used to initiate a device data protection protocol on a user device 150.

In some implementations, the monitoring system control unit 110 (or monitoring application server 170) may be able to access data feeds from certain services and trigger an alarm event based on the accessed data feed. For example, in some implementations, the monitoring system control unit 110 (or monitoring application server 170) may trigger the occurrence of an event based on a determination that severe weather such as a tornado, hurricane, flash flood, or the like is predicted (or otherwise occurring) at a property 101 where the device 150 is located. The triggering of the event can trigger the broadcasting of one or more messages that can be used to initiate a device data protection protocol on a user device 150.

Figure 2:
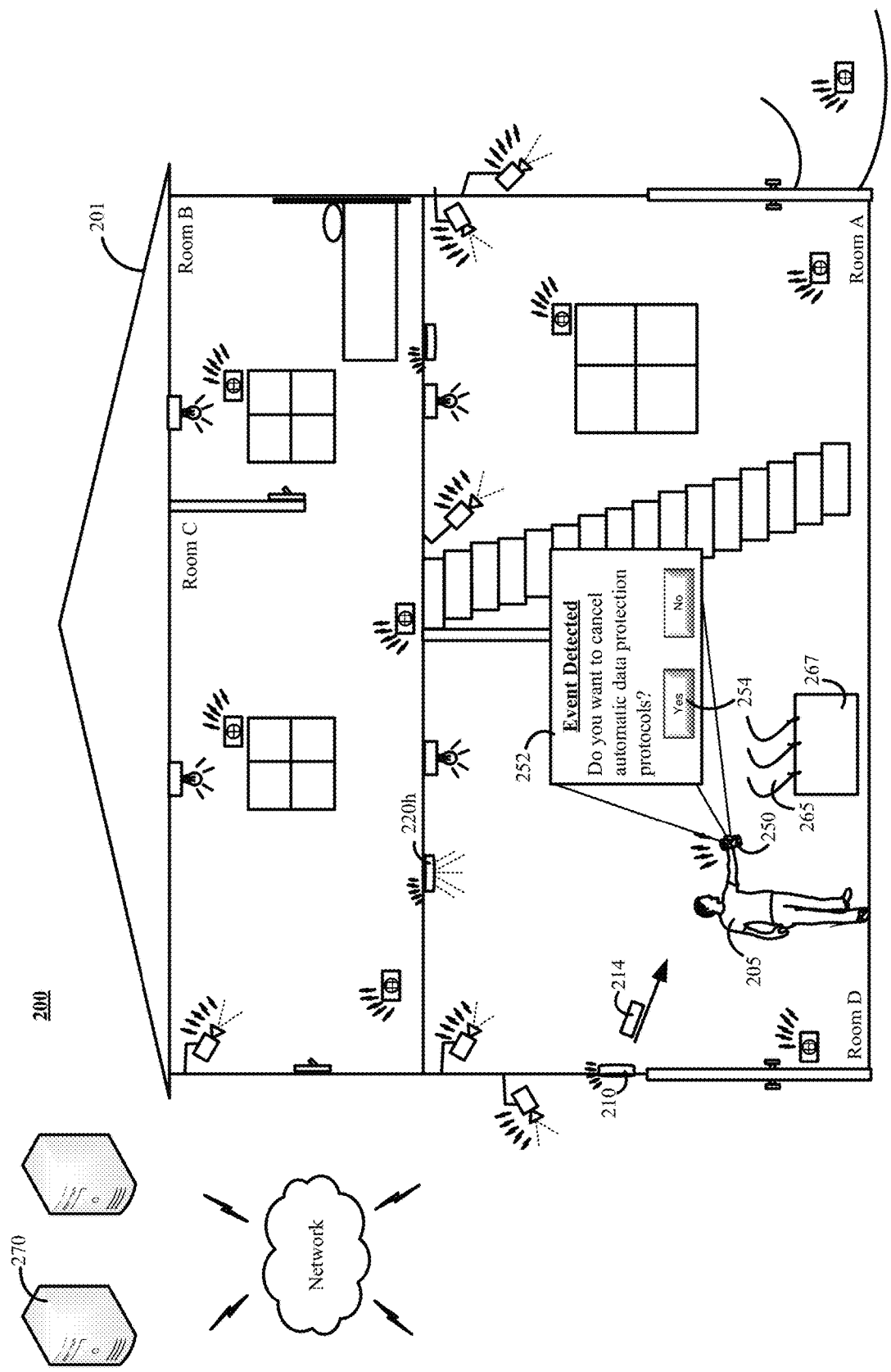
FIG. 2 is a contextual diagram of an example property monitoring system that cancels execution of a device data protection application based user feedback.

FIG. 2 is a contextual diagram of an example property monitoring system 200 that cancels execution of a device data protection application based user feedback.

The property monitoring system 200 is substantially similar to the property monitoring system 100 described above. However, the property monitoring system 200 of FIG. 2 shows an example of a detected event where a user 205 is present at the property 201 and decides to cancel the execution of a device data protection protocol.

With reference to FIG. 2, the monitoring system control unit 210 (or monitoring application server 270) receives sensor data from a sensor 220h such as smoke detector. The smoke detector may detect the presence of smoke 265 in the property 201. However, the smoke 265 detected by the smoke detector in the example of FIG. 2 merely originates from food that the user 205 was cooking on a stove 267 and does not pose a significant risk of starting a fire.

Based on the sensor data from sensor 220h, the monitoring system control unit 210 (or monitoring application server 270) transmits a message 214 that includes instructions for the device 250 to initiate a device data protection protocol. The message 214 is received by the device 250, which displays a prompt 252 asking the user 205 whether the user 205 wants to cancel execution of the device data protection protocol. In this example, since the user 205 is at the property 201 and knows there is no significant risk of fire, the user 205 may provide user feedback requesting cancellation of the device data protection protocol. The user feedback may include the selection of the icon 254, input of a password, input of a PIN, or the like. In response to the user's feedback, the device 250 may cancel execution of the device data protection protocol.

Figure 3:
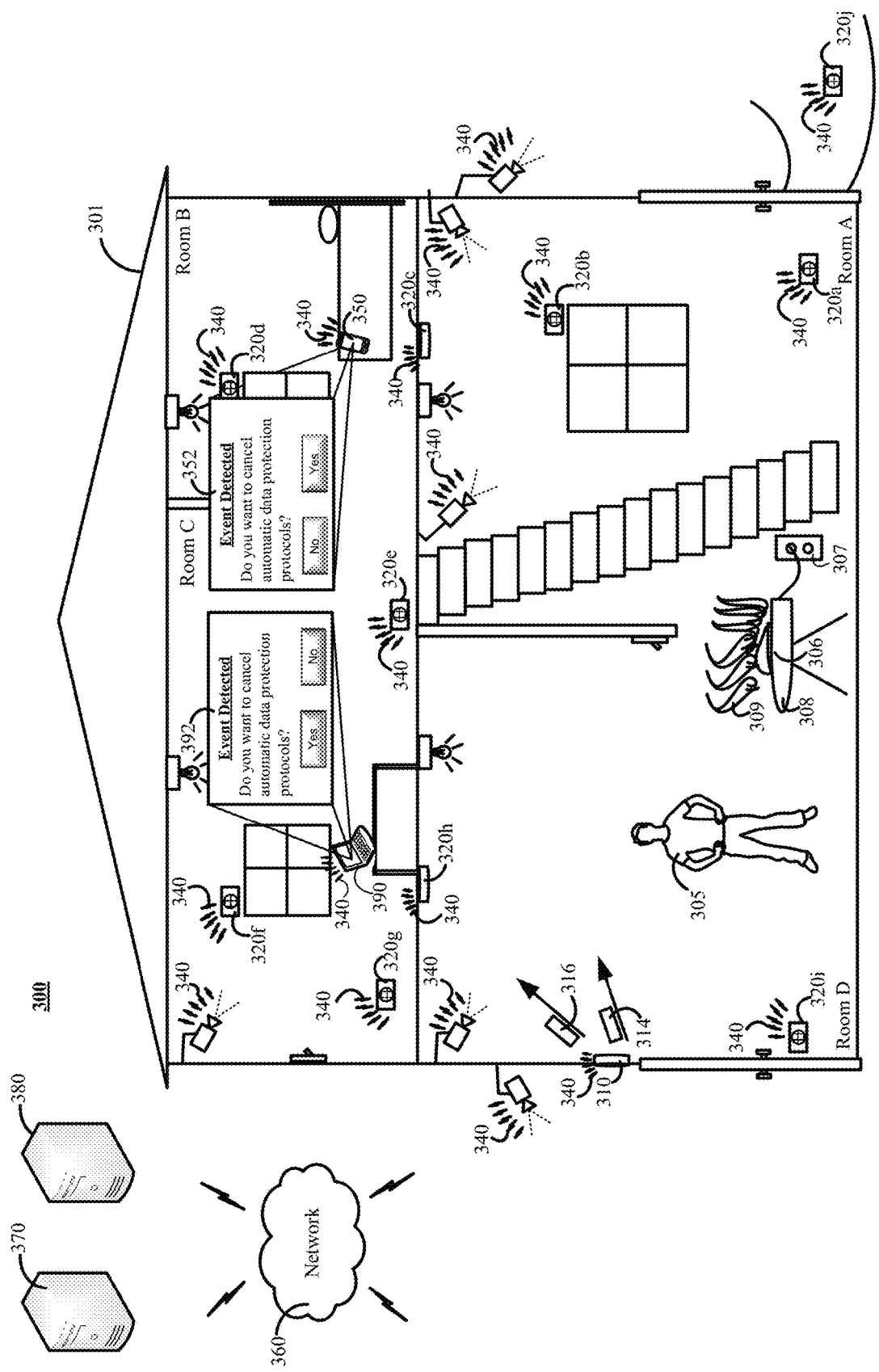
FIG. 3 is a contextual diagram of an example property monitoring system that protects data on a device in response to the detection of an emergency event.

FIG. 3 is a contextual diagram of an example property monitoring system 300 that protects data on a device in response to the detection of an emergency event.

The property monitoring system 300 is substantially similar to the property monitoring system 100 described above. However, the property monitoring system 300 of FIG. 3 shows an example of a security system that is detecting an emergency event in a property 301 that includes multiple devices 350, 390 storing device data.

With reference to FIG. 3, the user 305 is located in Room D of the property 301. The user 305 has left multiple devices such as device 350 and device 390 scattered throughout the property 301 in at least Room C and Room B. While the user is located at the property 301, a fire 309 occurs as a result of an iron 306 being left plugged into a wall outlet 307 with the hot side of the iron 306 down on an ironing board 308.

Because of the location of the fire 309, the user 305 cannot walk, run, or the like past the fire 309 to get to the stairs to recover the user's devices such as devices 350 and 390. Instead, the user 305 must flee the property 301 to avoid being injured by the fire 309. Aspects of the present disclosure can be used to protect the device data stored on the user's devices 350 and 390, which are both out of reach due to the fire 309.

For example, the monitoring system control unit 310 (or monitoring application server 370) can receive sensor data from one or more sensors 320a, 320b, 320c, 320d, 320e, 320f, 320g, 320h, 320i, 320j such as one more smoke sensors, one or more temperature sensors, or the like. The monitoring system control unit 310 (or monitoring application server 370) may analyze the sensor data and, based on the sensor data, determine that an emergency event such as a fire is occurring at the property 301.

The monitoring system control unit 310 (or monitoring application server 370) may transmit messages 314, 316 that each include an instruction to initiate a device data protection protocol to respective devices 350, 390 in the property 301. In one implementation, the monitoring system control unit 310 (or monitoring application server 370) is aware of each device 350, 390 in the property 301 because the user 305 has registered the device with a device lockdown service provided by the monitoring system 300 and the monitoring system control unit 310 (or monitoring application server 370) is configured to monitor registered devices. Alternatively, or in addition, the monitoring system control unit 310 (or monitoring application server 370) may be aware of each device 350, 390 because each respective device is periodically polling the monitoring system control unit 310 (or monitoring application server 370).

Each respective message 314, 316 includes an instruction to initiate a device data protection protocol on a respective recipient device 350, 390 that receives the respective message 314, 316. In some implementations, the messages 314, 316 may include data that is indicative of the type of event that was detected by the monitoring system control unit 310 (or monitoring application server 370). The type of event may include, for example, an alarm event, an emergency event, or the like. In the example of FIG. 3, the message 314 is directed towards the device 350 whereas the message 316 is directed towards the device 390. Each respective device 350, 390 receives a message 314, 316 that is sent to the device 350, 390, respectively. Though an example of two devices and two respective messages is provided here, the present disclosure need not be so limited. Such messages may be transmitted to each of one or more devices in the property 301 that have been configured to execute a device data protection protocol, as described by this specification.

A device data protection protocol is initiated for each device 350, 390. Each respective device displays a prompt 352, 392 for a predetermined amount of time to provide a user with the opportunity to cancel execution of the device data execution protocol. In this example, the predetermined amount of time expires since the user 305 has already fled the burning house and execution of the device data protection protocol continues. The devices 350, 390 each access their respective device profiles and can begin executing the device data protocol.

In this example, the user 305 has configured each respective device profile to perform particular device data protection operations per particular events. That is, the user 305 has configured the device profile for each device 350, 390 to perform a first set of operations for an emergency event, a second set of operations for an alarm event, and the like. In the example of FIG. 3, the device profile for each device is configured to backup relevant data from the devices 350, 390 in accordance with the user's 305 data backup preferences in response to emergency events. Accordingly, in response to the message 314, 316, each respective device may begin backing up data to the cloud server 380 via one or more networks 340, 360 based on the user's 305 backup preferences in each respective device profile. This protects the user's device data from loss in the event that the entire property burns down with the user's 305 devices 350, 390 inside.

Figure 4:
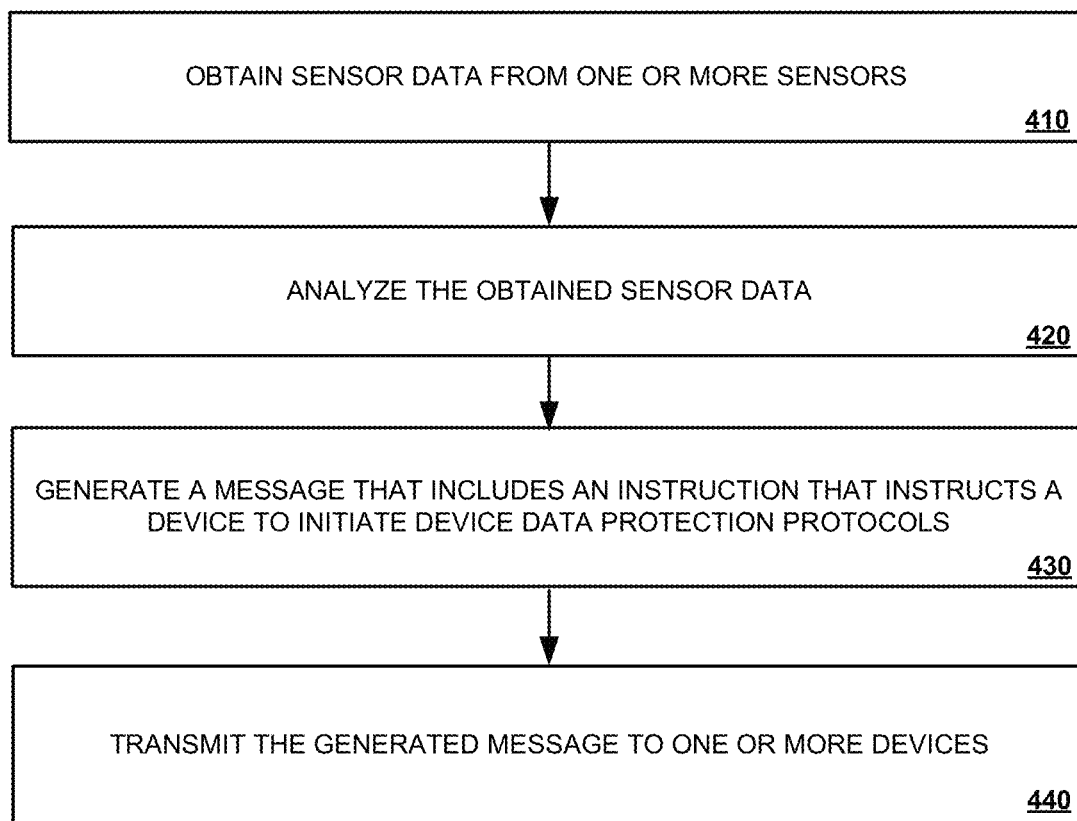
FIG. 4 is a flowchart of an example process for using a monitoring system to protect data on a device in response to the detection of an event.

FIG. 4 is a flowchart of an example process 400 for using a monitoring system to protect data on a device in response to the detection of an event. Generally, the process 400 includes obtaining sensor data from one or more sensors (410), analyzing the obtained sensor data (420), generating a message that includes an instruction that instructs a device to initiate a device data protection protocol (430), and transmitting the generated message to one or more devices (440). The actions of each stage of the process 400 are described below as being performed by a monitoring system. This may include, for example, each stage of the process 400 being performed by a monitoring unit of the monitoring system. The monitoring unit of the monitoring system may include a monitoring system control unit, a monitoring application server, or a combination thereof.

In more detail, monitoring system obtains 410 sensor data from one or more sensors. Obtaining sensor data from one or more sensors may include, for example, obtaining data generated by one or more motion sensors, one or more smoke sensors, one or more temperature sensors, one or more glass break sensors, one or more biometric sensors, a combination thereof, or the like.

The monitoring system analyzes 420 the sensor data obtained at stage 410 to determine whether a potential event is occurring at the property where the sensor data originated. For example, the monitoring system may determine, based on the obtained sensor data, that there was no prior movement inside a property, a glass break sensor was triggered, and a moving object entered through a window and conclude that a potential alarm event is occurring. By way of a different example, the monitoring system may determine that smoke sensors are returning data indicative of the presence of smoke and temperature sensors are reporting higher temperatures and conclude that there is a potential emergency event (e.g., a fire) at the property where the sensor data originated.

The monitoring system generates 430 a message that includes an instruction that instructs a user device to initiate a device data protection protocol. The message may be generated independent of any communication from a user device. Alternatively, the message may be generated in response to polling messages received by the monitoring system from the user device. In some implementations, the message may include data indicative of the type of potential event detected by the monitoring system based on the analysis of sensor data at stage 420.

The monitoring system transmits 440 the generated message to one or more user devices. The monitoring system may identify the one or more user devices that are to be a recipient of the message in a variety of different ways. In one implementation, a user may register each of his one or more user devices with a device data protection service provided by the monitoring system. In such instances, when an event is detected, the monitoring system may transmit the generated message to each registered device. Alternatively, each user device may periodically poll the monitoring system. In such instances, the monitoring system may transmit the generated message to each user device that is polling the monitoring system.

Figure 5:
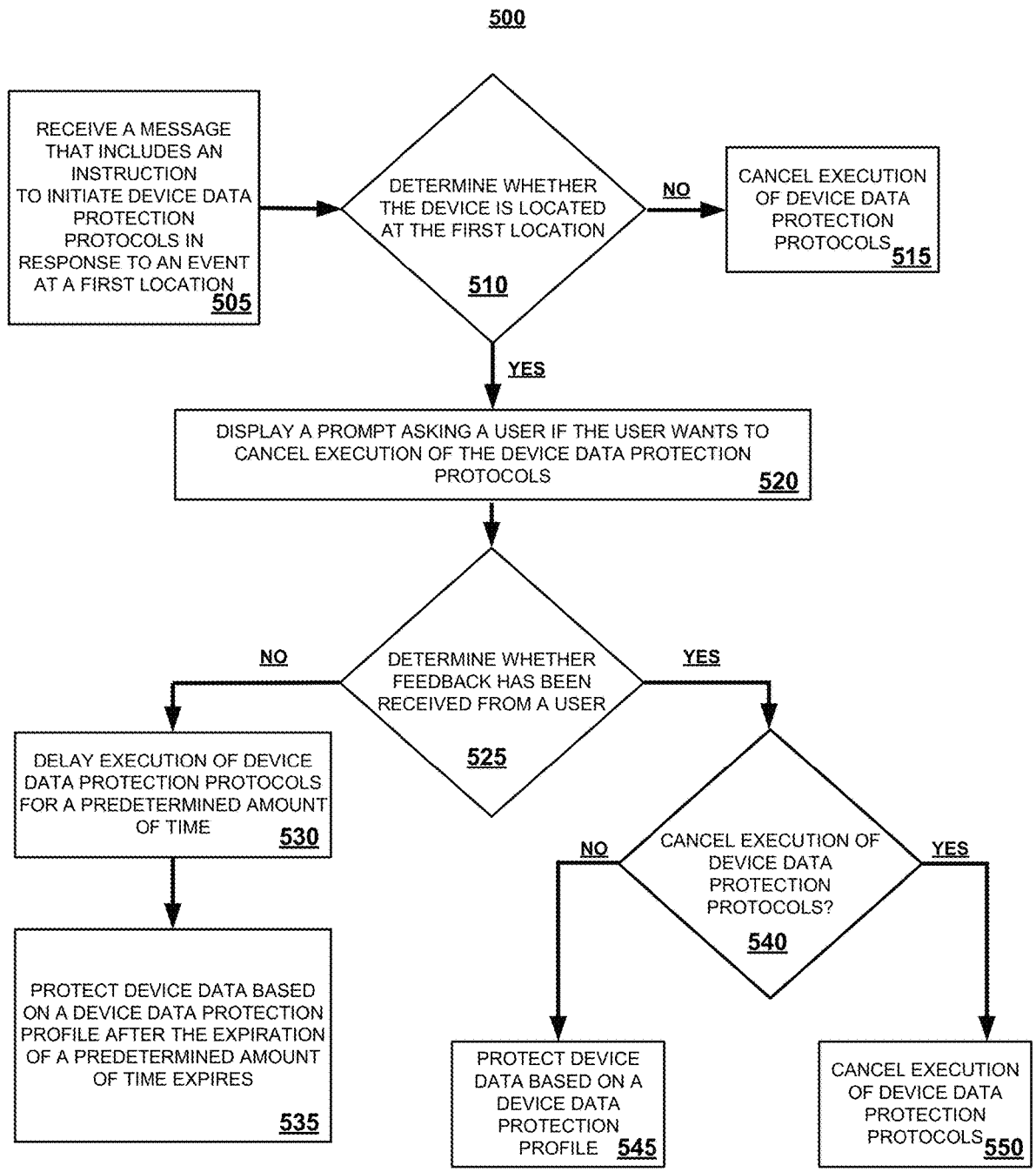
FIG. 5 is a flowchart of an example process for using a data protection application on a device to protect device data in response to an instruction from a monitoring system

FIG. 5 is a flowchart of an example process 500 for using a data protection application on a device to protect device data in response to an instruction from a monitoring system.

Generally, the process 500 includes receiving a message that includes an instruction to initiate a device data protection protocol 505 in response to the detection of an event at a first location and then determining whether the device is located at the first location 510. If it is determined that the device is not located at the first location, then the execution of the device data protection protocol is canceled 515. Alternatively, if it is determined that the device is located at the first location, then a user device displays a prompt asking a user if the user wants to cancel execution of the device data protection protocol 520, and determines whether feedback has been received from the user 525. If the user does not provide any feedback in response to the prompt at stage 520, the process further includes delaying execution of the device data protection protocol for a predetermined amount of time 530, protecting device data based on a device data protection profile after expiration of a predetermined amount of time 535. If the user does provide feedback in response to the prompt at stage 520, the process further includes determining 540 whether the user's feedback provides an indication to cancel execution of the device data protection protocol. If the user's feedback indicates to cancel execution of the device data protection protocol, then execution of the device data protection protocol is canceled 550. If the user's feedback indicates to not cancel execution of the device data protection protocol, then the execution of the device data protection protocol continues based on the device data protection profile 545.

In more detail, the user device receives 505 a message that includes an instruction to initiate a device data protection protocol in response to an event that is detected at a first location. The message may also include, for example, data that is indicative of the type of event detected by the monitoring system. The type of event may include, for example, an alarm event, an emergency event, or the like.

The user device determines 510 whether the user device is located at the first location. If it is determined that the device is not located at the first location, then the user device cancels execution of the device data protection protocol. Alternatively, if it is determined that the user device is located at the first location, then the device continues execution of the device data protection protocol. The user device can use one or more parameters to determine its location such as GPS coordinates, a WiFi SSID, a WAN/LAN IPS, or a statically defined location.

In some implementations, the first location may include a property such as a single family home, a townhome, an apartment building, an office building, or the like. In such instances, the user device may be determined to be located at the first location if the user device resides inside the property. Alternatively, or in addition, the user device may be determined to be located at the first location if the user device is within a predetermined distance of the property. In such instances, the user device may be determined to be located at the first location even though the user device is outside of the physical confines of the property such as on a patio, deck, gazebo, treehouse, detached garage, driveway, or the like.

The user device displays 520 a prompt asking a user if the user wants to cancel execution of the device data protection protocol. In some implementations, the prompt may request that the user input a password, PIN, biometric data, or the like in order to cancel execution of the device data protection protocol. The prompt may be displayed in a manner that does not interrupt any telephone calls to any emergency services number such as 9-1-1.

The user device determines 525 whether feedback from the user has been received in response to the prompt displayed at stage 520. If feedback from the user has been received, the system determines whether execution of the device data protection protocol should be cancelled. If feedback from the user indicates that execution of the device data protection protocol should be cancelled, the user device cancels 550 execution of the device data protection protocol. Data that indicates that execution of the device data protection protocol should be cancelled includes, for example, a login (e.g., username, password, or a combination thereof), a PIN, biometric data identifying the user, or the like. Alternatively, if feedback from the user indicates that execution of the device data protection protocol should not be cancelled, the user device continues to execute operations to protect 545 device data based on a device data protection profile.

At stage 525, the user device may alternatively determine that no user feedback has been received. The user device may wait to receive user feedback and delay 530 execution of the device data protection protocol for a predetermined period of time. The predetermined period of time may include a period of time that is sufficient to give the user of the user device an opportunity to cancel the device data protection protocol in the event of a false alarm. In some implementations, the predetermined period of time may be 5 seconds, 10 seconds, 30 seconds, or the like. Upon the expiration of the predetermined amount of time with no user feedback, the user device may continue to protect 535 device data based on the device data protection profile. Protecting device data based on the device data protection profile may include, for example, locking down the device, shutting down the device, backing-up data on the device to cloud storage, deleting data stored on the device, encrypting data stored on the device, or the like. The device data protection profile may include user preferences specifying user settings for each of the aforementioned device data protection operations.

Figure 6:
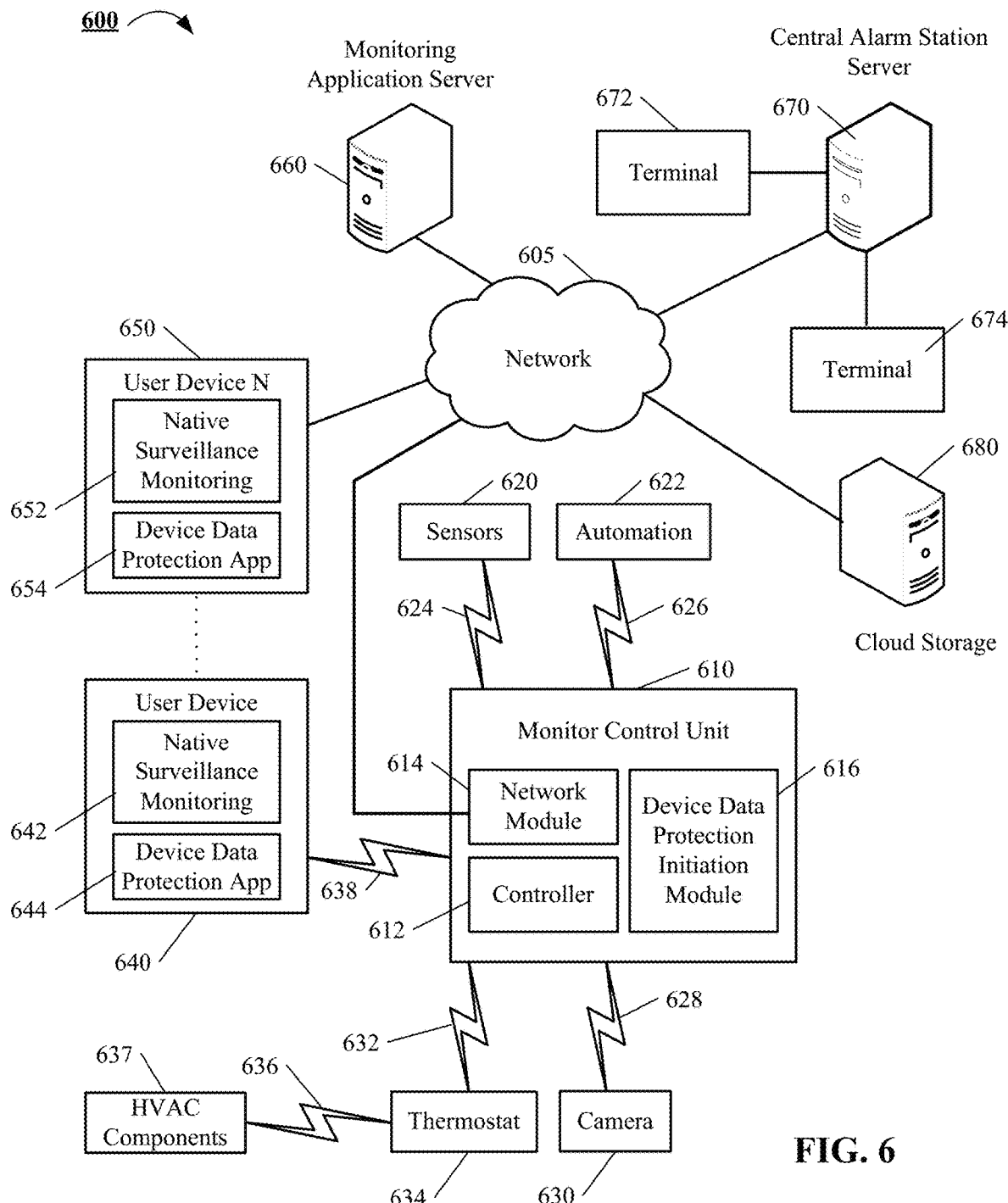
FIG. 6 is a block diagram of an example of a security monitoring system that protects data on a device in response to the detection of an event.

FIG. 6 is a block diagram of an example of a security monitoring system 600 that secures data on a device in response to the detection of an event.

The system 600 is configured to provide surveillance of a property, detect events, and protect data on user devices in response to the detected events. The electronic system 600 includes a network 605, a monitoring system control unit 610, one or more user devices 640, 650, a monitoring application server 660, a central alarm station server 670, and a cloud storage server 680. In some examples, the network 605 facilitates communications between the monitoring system control unit 610, the one or more user devices 640, 650, the monitoring application server 660, and the central alarm station server 670. In some examples, one or more of the user devices 640, 650 may be able to communicate with the cloud storage server 680.

The network 605 is configured to enable exchange of electronic communications between devices connected to the network 605. For example, the network 605 may be configured to enable exchange of electronic communications between the monitoring system control unit 610, the one or more user devices 640, 650, the monitoring application server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The monitoring system control unit 610 includes a controller 612, a network module 614, and a device data protection initiation module 616. The controller 612 is configured to control a monitoring system (e.g., a home alarm or security system) that includes the monitoring system control unit 610. In some examples, the controller 612 may include a processor or other control circuitry configured to execute instructions of a program that controls operation of an alarm system. In these examples, the controller 612 may be configured to receive input from sensors, detectors, or other devices included in the alarm system and control operations of devices included in the alarm system or other household devices (e.g., a thermostat, an appliance, lights, etc.). For example, the controller 612 may be configured to control operation of the network module 614 and the device data protection initiation module 616 that are each included in the monitoring system control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the monitoring system control unit 610 to communicate over a local area network and/or the Internet. The network module 614 also may be a voiceband modem configured to enable the alarm panel to communicate over the telephone lines of Plain Old Telephone Systems (POTS).

The device data protection initiation module 616 includes functionality that can generate and transmit notifications to one or more user devices 640 and 650 in response to a detected event. The notifications may include one or more instructions that instruct a device data protection application installed on respective user devices 640 and 650 to initiate execution of a device data protection protocol. The device data protection protocol may include instructions for performing a series of operations that includes, for example, first triggering a user device to determine if the user device is at the same location as the detected event, and if the device is at the same location as the detected event, trigger the user device to prompt for user feedback that requests whether additional device data protection operations should be performed. Then, in some implementations, based on the type of user feedback received, if any, responsive to the prompt, the user device may continue to perform the device data protection protocol via the performance of one or more additional device data protection operations including, for example, (i) backing up device data to a cloud server, (ii) deleting device data, (iii) locking down the device, (iv) shutting down the device, or (v) one or more operations leading to the execution of (i), (ii), (iii), or (iv). In some implementations, user feedback can be received responsive to the prompt that cancels the device data protection protocol without performing any additional operations.

Alternatively, in some implementations, performance of the one or more additional device data protection operations may begin simultaneously, or near simultaneously, with the display of the prompt. In such instances, if user feedback is received that requests cancellation of the additional user device data protection operations, then the additional user device data protection operation may be cancelled without being further performed. For example, in such implementations, backing-up device data to the cloud server can be stopped, after initially being started, responsive to the user feedback. Simultaneous, or near simultaneous, initiation of both the prompt and one or more other additional device data protection operations may provide the advantage of taking steps to secure device data while waiting for user feedback. In some implementations, this may ensure that the most important data such as currently open files are secured to a back-up cloud server.

In some implementations, the notification that includes the instructions to initiate device data protection protocols may also include a type (e.g., alarm event, emergency event, weather event, or the like) of the event detected. Such event type may be provide for display on the device.

The monitoring system that includes the monitoring system control unit 610 includes one or more sensors or detectors. For example, the monitoring system may include multiple sensors 620. The sensors 620 may include a contact sensor, a motion sensor, a glass break sensor, or any other type of sensor included in an alarm system or security system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 620 may include a radio-frequency identification (RFID) sensor that identifies a particular article that includes a pre-assigned RFID tag.

The monitoring system control unit 610 communicates with the module 622 and the camera 630 to perform surveillance or monitoring. The module 622 is connected to one or more devices that enable home automation control. For instance, the module 622 may be connected to one or more lighting systems and may be configured to control operation of the one or more lighting systems. Also, the module 622 may be connected to one or more electronic locks at the property and may be configured to control operation of the one or more electronic locks (e.g., control Z-Wave locks using wireless communications in the Z-Wave protocol. Further, the module 622 may be connected to one or more appliances at the property and may be configured to control operation of the one or more appliances. The module 622 may include multiple modules that are each specific to the type of device being controlled in an automated manner. The module 622 may control the one or more devices based on commands received from the monitoring system control unit 610. For instance, the module 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building monitored by the monitoring system control unit 610. The camera 630 may be configured to capture single, static images of the area and also video images of the area in which multiple images of the area are captured at a relatively high frequency (e.g., thirty images per second). The camera 630 may be controlled based on commands received from the monitoring system control unit 610.

The camera 630 may be triggered by several different types of techniques. For instance, a Passive Infra Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra Red, Z-wave controlled "white" lights, lights controlled by the module 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the monitoring control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring application server 660 over the Internet. In these implementations, image data captured by the camera 630 does not pass through the monitoring system control unit 610 and the camera 630 receives commands related to operation from the monitoring application server 660.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the monitoring system control unit 610 and can control the environmental (e.g., temperature) settings based on commands received from the monitoring system control unit 610.

In some implementations, the thermostat 634 is a dynamically programmable thermostat and can be integrated with the monitoring system control unit 610. For example, the dynamically programmable thermostat 634 can include the monitoring system control unit 610, e.g., as an internal component to the dynamically programmable thermostat 634. In addition, the monitoring system control unit 610 can be a gateway device that communicates with the dynamically programmable thermostat 634.

A module 637 is connected to one or more components of an HVAC system associated with a property, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

The sensors 620, the module 622, the camera 630, and the thermostat 634 communicate with the controller 612 over communication links 624, 626, 628, 632, 684, and 686. The communication links 624, 626, 628, 632, 684, and 686 may be a wired or wireless data pathway configured to transmit signals from the sensors 620, the module 622, the camera 630, and the thermostat 634 to the controller 612. The sensors 620, the module 622, the camera 630, and the thermostat 634 may continuously transmit sensed values to the controller 612, periodically transmit sensed values to the controller 612, or transmit sensed values to the controller 612 in response to a change in a sensed value.

The communication links 624, 626, 628, 632, 684, and 686 may include a local network. The sensors 620, the module 622, the camera 630, and the thermostat 634 and the controller 612 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 660 is an electronic device configured to provide monitoring services by exchanging electronic communications with the monitoring system control unit 610, the one or more user devices 640, 650, and the central alarm station server 670 over the network 605. For example, the monitoring application server 660 may be configured to monitor events (e.g., alarm events) generated by the monitoring system control unit 610. In this example, the monitoring application server 660 may exchange electronic communications with the network module 614 included in the monitoring system control unit 610 to receive information regarding events (e.g., alarm events) detected by the monitoring system control unit 110. The monitoring application server 660 also may receive information regarding events (e.g., alarm events) from the one or more user devices 640, 650.

In some examples, the monitoring application server 660 may route alarm data received from the network module 614 or the one or more user devices 640, 650 to the central alarm station server 670. For example, the monitoring application server 660 may transmit the alarm data to the central alarm station server 670 over the network 605.

The monitoring application server 660 may store sensor and image data received from the monitoring system and perform analysis of sensor and image data received from the monitoring system. Based on the analysis, the monitoring application server 660 may communicate with and control aspects of the monitoring system control unit 610 or the one or more user devices 640, 650.

The central alarm station server 670 is an electronic device configured to provide alarm monitoring service by exchanging communications with the monitoring system control unit 610, the one or more mobile devices 640, 650, and the monitoring application server 660 over the network 605. For example, the central alarm station server 670 may be configured to monitor alarm events generated by the monitoring system control unit 610. In this example, the central alarm station server 670 may exchange communications with the network module 614 included in the monitoring system control unit 610 to receive information regarding alarm events detected by the monitoring system control unit 610. The central alarm station server 670 also may receive information regarding alarm events from the one or more mobile devices 640, 650 and/or the monitoring application server 660.

The central alarm station server 670 is connected to multiple terminals 672 and 674. The terminals 672 and 674 may be used by operators to process alarm events. For example, the central alarm station server 670 may route alarm data to the terminals 672 and 674 to enable an operator to process the alarm data. The terminals 672 and 674 may include general-purpose computers (e.g., desktop personal computers, workstations, or laptop computers) that are configured to receive alarm data from a server in the central alarm station server 670 and render a display of information based on the alarm data. For instance, the controller 612 may control the network module 614 to transmit, to the central alarm station server 670, alarm data indicating that a sensor 620 detected a door opening when the monitoring system was armed. The central alarm station server 670 may receive the alarm data and route the alarm data to the terminal 672 for processing by an operator associated with the terminal 672. The terminal 672 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640, 650 are devices that host and display user interfaces. For instance, the user device 640 is a mobile device that hosts one or more native applications (e.g., the native surveillance application 642) and a device data protection application 644. The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a native surveillance application 642. The native surveillance application 642 refers to a software/firmware program running on the corresponding mobile device that enables the user interface and features described throughout. The user device 640 may load or install the native surveillance application 642 based on data received over a network or data received from local media. The native surveillance application 642 runs on mobile devices platforms, such as iPhone, iPod touch, Blackberry, Google Android, Windows Mobile, etc. The native surveillance application 642 enables the user device 640 to receive and process image and sensor data from the monitoring system.

The user device 650 may be a general-purpose computer (e.g., a desktop personal computer, a workstation, or a laptop computer) that is configured to communicate with the monitoring application server 660 and/or the monitoring system control unit 610 over the network 605. The user device 650 may be configured to display a surveillance monitoring user interface 652 that is generated by the user device 650 or generated by the monitoring application server 660. For example, the user device 650 may be configured to display a user interface (e.g., a web page) provided by the monitoring application server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640, 650 communicate with and receive monitoring system data from the monitoring system control unit 610 using the communication link 638. For instance, the one or more user devices 640, 650 may communicate with the monitoring system control unit 610 using various local wireless protocols such as wifi, Bluetooth, zwave, zigbee, HomePlug (ethernet over powerline), or wired protocols such as Ethernet and USB, to connect the one or more user devices 640, 650 to local security and automation equipment. The one or more user devices 640, 650 may connect locally to the monitoring system and its sensors and other devices. The local connection may improve the speed of status and control communications because communicating through the network 605 with a remote server (e.g., the monitoring application server 660) may be significantly slower.

Although the one or more user devices 640, 650 are shown as communicating with the monitoring system control unit 610, the one or more user devices 640, 650 may communicate directly with the sensors and other devices controlled by the monitoring system control unit 610. In some implementations, the one or more user devices 640, 650 replace the monitoring system control unit 610 and perform the functions of the monitoring system control unit 610 for local monitoring and long range/offsite communication.

In other implementations, the one or more user devices 640, 650 receive monitoring system data captured by the monitoring system control unit 610 through the network 605. The one or more user devices 640, 650 may receive the data from the monitoring system control unit 610 through the network 605 or the monitoring application server 660 may relay data received from the monitoring system control unit 610 to the one or more user devices 640, 650 through the network 605. In this regard, the monitoring application server 660 may facilitate communication between the one or more user devices 640, 650 and the monitoring system.

In some implementations, the one or more user devices 640, 650 may be configured to switch whether the one or more user devices 640, 650 communicate with the monitoring system control unit 610 directly (e.g., through link 638) or through the monitoring application server 660 (e.g., through network 605) based on a location of the one or more user devices 640, 650. For instance, when the one or more user devices 640, 650 are located close to the monitoring system control unit 610 and in range to communicate directly with the monitoring system control unit 610, the one or more user devices 640, 650 use direct communication. When the one or more user devices 640, 650 are located far from the monitoring system control unit 610 and not in range to communicate directly with the monitoring system control unit 610, the one or more user devices 640, 650 use communication through the monitoring application server 660.

Although the one or more user devices 640, 650 are shown as being connected to the network 605, in some implementations, the one or more user devices 640, 650 are not connected to the network 605. In these implementations, the one or more user devices 640, 650 communicate directly with one or more of the monitoring system components and no network (e.g., Internet) connection or reliance on remote servers is needed.

The user devices 640, 650 may each have a device data protection application 644, 654 installed on each respective device. For example, the device data protection application 644 includes programmed logic that can receive notifications from the monitor control unit 610. The notifications may include instructions that trigger the device data protection application 644 to begin executing device data protection protocols. In some implementations, the device data protection application 644 can periodically poll the monitor control unit 610 to make the control unit aware of the user devices' presence 642. The device data protection application 644 may include functionality stores a device data protection profile to store user preferences for protection of data in response to a detected event at the location of the user device 640, 650. In response to receiving a notification from the monitor control unit 610, the device data protection application 644 can perform data protection operations as specified by user preferences in a stored device data protection profile.

In some implementations, the system 600 provides end users with access to images captured by the camera 630 to aid in decision making. The system 600 may transmit the images captured by the camera 630 over a wireless WAN network to the user devices 640, 650. Because transmission over a wireless WAN network may be relatively expensive, the system 600 uses several techniques to reduce costs while providing access to significant levels of useful visual information.

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "Away" state, but set not to capture images when the alarm system is armed in a "Stay" state or disarmed. In addition, the camera 630 may be triggered to begin capturing images when the alarm system detects an event, such as an alarm event, a door opening event for a door that leads to an area within a field of view of the camera 630, or motion in the area within the field of view of the camera 630. In other implementations, the camera 630 may capture images continuously, but the captured images may be stored or transmitted over a network when needed.

Figure 7:
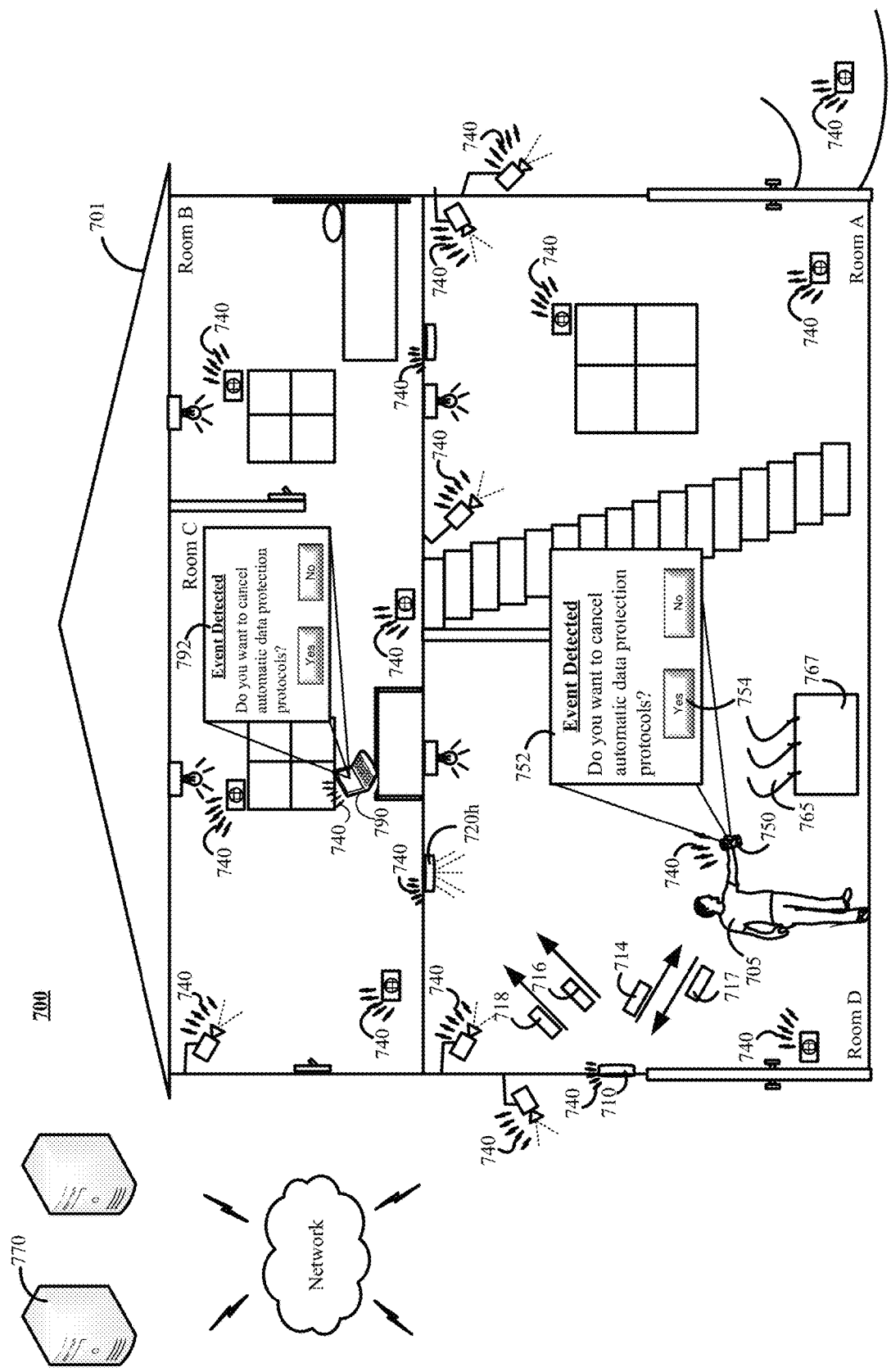
FIG. 7 is a contextual diagram of an example property monitoring system that cancels execution of a device data protection application on multiple devices based on user feedback received on a single device.

FIG. 7 is a contextual diagram of an example property monitoring system 700 that cancels execution of a device data protection application on multiple devices based on user feedback received on a single device.

The property monitoring system 700 is substantially similar to the property monitoring systems 100 and 200 described above. However, the property monitoring system 700 of FIG. 7 shows an example of a detected event where a user 705 is present at the property 701 and decides to cancel execution of a device data protection protocol on multiple devices 750, 790 based on user feedback input into a single device 750.

With reference to FIG. 7, the monitoring system control unit 710 (or monitoring application server 770) receives sensor data from a sensor 720h such as smoke detector via network 740. The smoke detector may detect the presence of smoke 765 in the property 701. However, as similarly described with reference to the example of FIG. 2, the smoke 765 detected by the smoke detector in the example of FIG. 7 merely originates from food that the user 705 was cooking on a stove 767 and does not pose a significant risk of starting a fire.

The monitoring system control unit 710 (or monitoring application server 770) may transmit messages 714, 716 that each include an instruction to initiate a device data protection protocol to respective devices 750, 790 in the property 701. In one implementation, the monitoring system control unit 710 (or monitoring application server 770) is aware of each device 750, 790 in the property 701 because the user 705 has registered the device with a device lockdown service provided by the monitoring system 700 and the monitoring system control unit 710 (or monitoring application server 770) is configured to monitor registered devices. Alternatively, or in addition, the monitoring system control unit 710 (or monitoring application server 770) may be aware of each device 750, 790 because each respective device is periodically polling the monitoring system control unit 710 (or monitoring application server 770).

Each respective message 714, 716 includes an instruction to initiate a device data protection protocol on a respective recipient device 750, 790 that receives a respective message 714, 716. In some implementations, the messages 714, 716 may include data that is indicative of the type of event that was detected by the monitoring system control unit 710 (or monitoring application server 770). The type of event may include, for example, an alarm event, an emergency event, or the like. In the example of FIG. 7, the message 714 is directed towards the device 750 whereas the message 716 is directed towards the device 790. Each respective device 750, 790 receives the message 714, 716 that is sent to the device 750, 790, respectively. Though an example of two devices and two respective messages is provided here, the present disclosure need not be so limited. Such messages may be transmitted to each of one or more devices located in the property 701 that have been configured to execute a device data protection protocol, as described by this specification.

A device data protection protocol is initiated for each respective device 750, 790. Each respective device displays a prompt 752, 792 for a predetermined amount of time to provide a user 705 with the opportunity to cancel execution of the device data execution protocol on each device. In the example of FIG. 7, since the user 705 is at the property 701 and knowns there is no significant risk of fire, the user 705 of the device 750 may provide user feedback requesting cancellation of the respective device data protection protocols. The user feedback may include the selection of the icon 754, input of a password, input of a PIN, or the like. In response to the user's feedback, the device 750 may cancel execution of the device data protection protocol executing on each of the devices 750, 790 located in the property 701.

For example, user feedback may be received by the device 750 via the user's selection of the "Yes" selectable icon 754. In response to the selection of the "YES" selectable icon 754, the device 750 can (i) cancel an automatic data protection protocol being initiated on the user device 750, and (ii) generate and transmit a message 717 to the monitoring system control unit 710 (or monitoring application server 770) that instructs the monitoring system control unit 710 (or monitoring application server 770) to broadcast one or more cancelation messages 718 to the one or more other devices 790 located in the property 701. Alternatively, in some implementations, an application residing on the user device 750 may generate and transmit a cancelation message to one or more other devices such as device 790 that is located in the property 701. The one or more devices such as device 790 located in the property 701 can receive the cancelation message 718. Upon the receipt of cancelation message 718, each of the one or more other devices 790 may process the cancelation message 718 and cancel execution of the device data protection protocol on each of the one or more devices 790.

Though an example of only two devices 750, 790 is shown, it is contemplated that the system of FIG. 7 can also extend to additional devices. In such instances, the monitoring system control unit 710 (or monitoring application server 770) would receive the message 717 and generate multiple cancelation messages that are similar to the cancelation message 718 (e.g., one for each device located in the property 701 other than the device 750 that was used by the user to submit the cancelation request). Upon receipt of a cancelation message of the multiple cancelation messages, a device may cancel execution of the device data protection protocol on the device.

Accordingly, the user 705 can cancel execution of execution of a device data protection protocol that is running on each device of multiple devices based on user feedback received on a single device using the system 700. This provides the advantage of a user canceling execution of device data protection protocols on multiple devices without the need for the user to walk around the property 701 and input data into each respective device in property 701 manually to cancel execution of the device data protection protocol executin on each device.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A method comprising:
    receiving, by a user device and from a monitoring unit, an instruction to initiate execution of a user device data protection protocol after a determination by the monitoring unit, based on (i) sensor data from one or more sensors installed at a property or (ii) image data or video data from one or more cameras installed at the property, that an event has occurred at the property;
    determining whether the user device is located at the property;
    in response to a determination that the user device is located at the first location, displaying, by the user device, a prompt that asks if execution of the user device data protection protocol should be canceled;
    determining whether user feedback responsive to the prompt has been received from a user of the user device within a predetermined amount of time; and
    in response to a determination that the predetermined amount of has expired without receiving user feedback responsive to the prompt, performing one or more data protection operations initiated by the device data protection protocols to protect user device data.

2. The method of claim 1, the method further comprising:
    in response to a determination that the user device is not located at the first location, cancelling execution of the user device data protection protocol without displaying a prompt that asks if execution of the device data protection protocol should be canceled.

3. The method of claim 1, the method further comprising:
    in response to a determination that user feedback responsive to the prompt (i) has been received from a user of the user device within the predetermined amount of time and (ii) indicates that execution of the device data protection protocol should be canceled, canceling execution of user device data protection protocol without performing additional data protection operations to protect device data.

4. The method of claim 1, wherein the one or more data protection operations comprises locking the user device until a user of the user device inputs predetermined authentication information that can be processed, by the user device, to unlock the user device.

5. The method of claim 1, wherein the one or more data protection operations comprises shutting down the user device.

6. The method of claim 1, wherein the one or more data protection operations comprises initiating upload of at least a portion of the device data stored on the user device to a cloud storage device.

7. The method of claim 1, wherein the one or more data protection operations comprises initiating deletion of at least a portion of the device data stored on the device.

8. The method of claim 1, wherein the one or more data protection operations comprises initiating encryption of at least a portion of the device data stored on the device.

9. The method of claim 1, wherein the one or more data protection operations comprises:
    (i) locking the user device until a user of the user device inputs predetermined authentication information that can be processed, by the user device, to unlock the user device;
    (ii) shutting down the user device;
    (iii) initiating upload of at least a portion of the device data stored on the user device to a cloud storage device;
    (iv) initiating deletion of at least a portion of the device data stored on the device; or (v) initiating encryption of at least a portion of the device data stored on the device.

10. The method of claim 9, the method further comprising:
selecting a data protection operation of the one or more data protection operations to perform, wherein the selecting includes selecting a particular data protection operation of the one or more data protection operations based on user preferences specified in a device data protection profile.

11. The method of claim 1,
wherein the one or more data protection operations comprises one of:
(i) initiating upload of at least a portion of the device data stored on the user device to a cloud storage device;
(ii) initiating deletion of at least a portion of the device data stored on the device; or
(iii) initiating encryption of at least a portion of the device data stored on the device, and
wherein the method further comprises:
identifying, based on user preferences specified in a device data protection profile, a particular portion of the device data as the first portion of the device data to be uploaded, deleted, or encrypted during performance of the one or more data protection operations.

12. The method of claim 1,
wherein the one or more or data protection operations comprises one of:
(i) initiating upload of at least a portion of the device data stored on the user device to a cloud storage device;
(ii) initiating deletion of at least a portion of the device data stored on the device; or
(iii) initiating encryption of at least a portion of the device data stored on the device, and
wherein the method further comprises:
identifying, based on a determination that a particular file is open on the user device, the particular file as the first portion of the device data to be uploaded, deleted, or encrypted during performance of the one or more data protection operations.

13. The method of claim 1, wherein the monitoring unit is positioned at a location that is remote from the property.

14. A user device, comprising:
one or more processors and one or more storage devices, the one or more storage devices storing instructions that, when executed by the one or more processors, cause the one or more processors to perform operations comprising:
receiving, by a user device and from a monitoring unit, an instruction to initiate execution of a user device data protection protocol after a determination by the monitoring unit, based on (i) sensor data from one or more sensors installed at a property or (ii) image data or video data from one or more cameras installed at the property, that an event has occurred at the property;
determining whether the user device is located at the property;
in response to a determination that the user device is located at the first location, displaying, by the user device, a prompt that asks if execution of the user device data protection protocol should be canceled;
determining whether user feedback responsive to the prompt has been received from a user of the user device within a predetermined amount of time; and in response to a determination that the predetermined amount of has expired without receiving user feedback responsive to the prompt, performing one or more data protection operations initiated by the device data protection protocols to protect user device data.

15. The user device of claim 14, the operations further comprising:
in response to a determination that the user device is not located at the first location, cancelling execution of the user device data protection protocol without displaying a prompt that asks if execution of the device data protection protocol should be canceled.

16. The user device of claim 14, the operations further comprising:
in response to a determination that user feedback responsive to the prompt (i) has been received from a user of the user device within the predetermined amount of time and (ii) indicates that execution of the device data protection protocol should be canceled, canceling execution of user device data protection protocol without performing additional data protection operations to protect device data.

17. The user device of claim 14, wherein the one or more data protection operations comprises:
(i) locking the user device until a user of the user device inputs predetermined authentication information that can be processed, by the user device, to unlock the user device;
(ii) shutting down the user device;
(iii) initiating upload of at least a portion of the device data stored on the user device to a cloud storage device;
(iv) initiating deletion of at least a portion of the device data stored on the device; or
(v) initiating encryption of at least a portion of the device data stored on the device.

18. The user device of claim 17, the operations further comprising:
selecting a data protection operation of the one or more data protection operations to perform, wherein the selecting includes selecting a particular data protection operation of the one or more data protection operations based on user preferences specified in a device data protection profile.

19. The user device of claim 14,
wherein the one or more data protection operations comprises one of:
(i) initiating upload of at least a portion of the device data stored on the user device to a cloud storage device;
(ii) initiating deletion of at least a portion of the device data stored on the device; or
(iii) initiating encryption of at least a portion of the device data stored on the device, and
wherein the method further comprises:
identifying, based on user preferences specified in a device data protection profile, a particular portion of the device data as the first portion of the device data to be uploaded, deleted, or encrypted during performance of the one or more data protection operations.

20. The user device of claim 14,
wherein the one or more or data protection operations comprises one of:
(i) initiating upload of at least a portion of the device data stored on the user device to a cloud storage device;

(ii) initiating deletion of at least a portion of the device data stored on the device; or
(iii) initiating encryption of at least a portion of the device data stored on the device, and
identifying, based on a determination that a particular file is open on the user device, the particular file as the first portion of the device data to be uploaded, deleted, or encrypted during performance of the one or more data protection operations.

\* \* \* \* \*